(12) United States Patent
Eller et al.

(10) Patent No.: US 7,441,834 B2
(45) Date of Patent: Oct. 28, 2008

(54) WIND DEFLECTOR

(75) Inventors: Thorsten Eller, Eckersdorf (DE); Herbert Wolf, Altdorf (DE); Kurt Kugler, Stockdorf (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/572,883

(22) PCT Filed: Jul. 26, 2005

(86) PCT No.: PCT/DE2005/001330

§ 371 (c)(1), (2), (4) Date: Jul. 25, 2007

(87) PCT Pub. No.: WO2006/012860

PCT Pub. Date: Feb. 9, 2006

(65) Prior Publication Data

US 2007/0278831 A1    Dec. 6, 2007

(30) Foreign Application Priority Data

Jul. 27, 2004    (DE) ...................... 10 2004 036 327

(51) Int. Cl.
*B60J 7/22* (2006.01)
(52) U.S. Cl. .................................................. 296/217
(58) Field of Classification Search ................ 296/217
See application file for complete search history.

(56) References Cited

U.S. PATENT DOCUMENTS 3,984,143 A * 10/1976 Vermeulen .................. 296/217
6,648,406 B2   11/2003 Dittrich et al.

FOREIGN PATENT DOCUMENTS

| DE | 1605968 | | 6/1971 | |
|---|---|---|---|---|
| DE | 19809943 A1 | | 9/1999 | |
| DE | 20313783 U1 | | 12/2003 | |
| EP | 0744311 A1 | | 11/1996 | |
| JP | 358089419 | * | 5/1983 | ................. 296/217 |
| WO | 2004078506 A1 | | 9/2004 | |

OTHER PUBLICATIONS

English International Search Report for PCT/DE2005/001330.

* cited by examiner

*Primary Examiner*—Dennis H Pedder
(74) *Attorney, Agent, or Firm*—David S. Safran

(57) ABSTRACT

A wind deflector for a motor vehicle roof which is movable between a rest position and an operating position, the bearing means containing a spring arrangement which pretensions the wind deflector into the raised operating position. The spring arrangement has a first range of motion of low spring force and a second range of motion of higher spring force, which are assigned to a first adjustment region of the wind deflector out of its raised operating position and a second adjustment region of the wind deflector into its lowered rest position. The wind deflector is lowerable in the range of motion of low spring force by the force of the head wind and in the second range of motion of higher spring force the actuating means with an adjustment force which exceeds the force of the head wind is active for lowering the wind deflector.

10 Claims, 5 Drawing Sheets

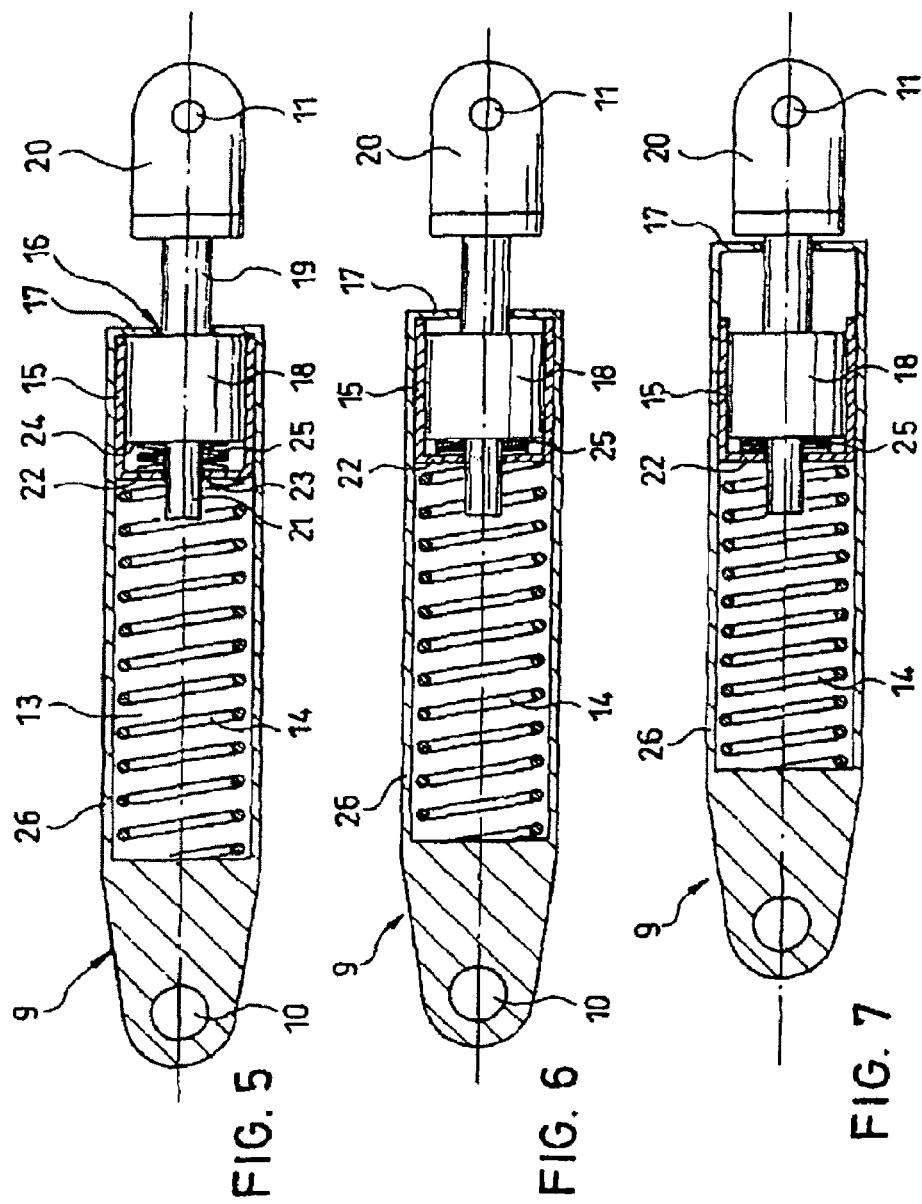

WIND DEFLECTOR

BACKGROUND OF THE INVENTION

1. Field of the Invention

The invention relates to a wind deflector for a motor vehicle roof, which is movably supported by a bearing means between a rest position and an operating position, the bearing means containing a spring means which pretensions the wind deflector into the raised operating position.

2. Description of Related Art

German Utility Model DE 203 13 783 U1 discloses a sliding roof device of a motor vehicle with a wind deflector which is pivotally supported by means of a support arm on the vehicle roof. Between the support arm and the vehicle roof there is a telescoping spring and damping element which pretensions the wind deflector into its operating position. At a higher driving speed, the air flow presses the wind deflector down into a lower position against the force of the spring and damping element. The spring and damping element is designed such that the wind deflector is dynamically matched to the driving speed in its height to the vehicle roof. The structure of the spring and damping element is not explained.

German Patent Application DE 198 09 943 A1 discloses a wind deflector on the roof opening of a sliding roof which is pivotally supported by means of two raising levers on the roof frame and in its raised operating position with respect to the degree to which it is raised is controlled by the drive of a sliding inside roof lining, which drive is independent of the drive of the sliding roof cover. Preferably, the position of the wind deflector is controlled depending on the driving speed of the motor vehicle.

The wind deflector of the sliding roof disclosed in German Patent Application DE 100 48 983 A1 and corresponding U.S. Pat. No. 6,648,406 B2 is pivotally supported near its front edge by means of a pivoting support on the fixed vehicle roof and is pivotally connected near its rear edge to a raising lever which is formed as a piston-cylinder-spring element and is pivotally supported on the other hand on the vehicle roof. The spring element raises the wind deflector into its operating position, and conversely, the horizontally movable cover of the sliding roof presses the wind deflector down into its closed position by its acting on the spring element.

SUMMARY OF THE INVENTION

The object of this invention is to devise the initially mentioned wind deflector with a spring means which allows improved dynamic behavior of the raised wind deflector which can be adapted to the driving speed.

This object is achieved in accordance with the invention in the aforementioned wind deflector in that the spring means has a first range of motion of low spring force and a second range of motion of higher spring force, which are assigned to a first adjustment region of the wind deflector out of its raised operating position and a second adjustment region of the wind deflector into its lowered rest position.

In the first adjustment region, the wind deflector can be moved between its fully raised operating position in which it or its wind deflector louver is located, for example, distinctly above the roof skin which is in front of the roof opening and over and under which flow takes place and thus prevents drumming in the vehicle interior, and a lowered intermediate position in which it or the wind deflector louver is located, for example, only barely over the level of the roof skin, and thus, especially at high driving speeds, produces less wind noise on the roof opening due to the lower raising height. In this first adjustment region, the spring force of the spring means is less than in the second adjustment region so that, accordingly, only a smaller force is necessary to lower the wind deflector. The force for lowering the wind deflector can be provided, for example, by a drive means or actuation means especially depending on the driving speed with the corresponding wind pressure on the opening roof opening. The drive means or actuation means is coupled, for example, to the bearing arm of the bearing means of the wind deflector and presses it down against the spring force of the spring means.

In one especially preferred configuration of the invention, the wind deflector can be lowered in the first adjustment region and in the first range of motion of low spring force by the force of the head wind, and in the second adjustment region or in the second range of motion of higher spring force, the actuating means is active with an adjustment force which exceeds the force of the head wind for lowering the wind deflector. The force of the head wind is produced as the vehicle is traveling by the air which is flowing over the roof, with a flow velocity which is dependent on the driving speed. When the driving speed changes in a corresponding speed range, thus the wind deflector in the first adjustment region is automatically positioned into the respective streamlined position, in which the force of the head wind and force of the spring means are in equilibrium. In the first adjustment region, the spring deflection can be considered soft. On the end of the first adjustment region, the spring force of the spring means becomes greater and thus limits the adjustment region in which the wind deflector can be moved by the force of the head wind.

Advantageously, the spring means has a spring characteristic which is staggered between the first range of motion of low spring force and the second range of motion of higher spring force. The step forms a defined transition on which the spring behavior of the spring means changes distinctly. The step prevents a higher force of the head wind from moving the wind deflector further down out of its lowered intermediate position.

Preferably, a cover designed for clearing and closing of the roof opening of an openable vehicle roof or a component which is connected to the cover forms the actuating means. The movable cover can be easily used for actuation and also applies the required actuating forces.

According to one preferred configuration of the invention, the spring means has a first spring and a second spring, the spring force of the first spring being smaller than that of the second spring. The two springs are arranged such that, when the wind deflector is lowered, first of all, the first spring which has the lower spring force yields, while the second spring remains rigid. Then, the second spring which has the higher spring force also yields. The first spring like the second spring can be formed by individual springs or spring assemblies.

Furthermore, it can be provided that the spring means is a spring strut of variable length with a housing part and a piston part which can be moved relative to the housing part, that the two springs formed as compression springs are located functionally between the housing part and the piston part in series connection and are separated from one another by a movable separating element, that in the lengthwise direction of the spring strut which it assumes in the raised open position of the wind deflector, the two springs pretension the piston part against the end stop on the housing part, and in doing so, the second spring keeps the separating element pretensioned likewise against the end stop on the housing part, that when the spring strut is shortened in the first adjustment region the second spring which has the higher spring force keeps the separating element pretensioned on the end stop, while the piston part moves against the separating element as the first spring is shortened, and that with further shortening of the spring strut in the second adjustment region the piston part shortens the second spring with entrainment of the separating element.

When the spring characteristic of the spring means on the transition from the first to the second adjustment region has an intermediate section in which an increase of the adjustment force or of the force of the head wind does not cause shortening of the spring means or spring strut, at higher driving speeds a lower adjustment limit of the wind deflector can be reliably maintained.

Advantageously, in one reliable configuration, the separating element is formed as a sleeve or a pot and is movably located between the housing part and the piston part, and is slide-supported especially on the housing part or the piston part.

Preferably, the end wall of the housing part forms the end stop for the separating element and/or the piston part, but there can also be other stops on the housing part.

In particular, the first spring has a soft spring characteristic and the second spring has a spring characteristic which is hard compared to the first spring so that the wind deflector is set to be soft by the force of the head wind, conversely adjustment can take place by the cover in a hard manner and thus free of rattling.

One embodiment of the wind deflector is explained in detail below with reference to the drawings.

BRIEF DESCRIPTION OF THE DRAWINGS

FIG. 5 shows the uncompressed spring strut with the wind deflector raised, in a lengthwise section;

FIG. 6 shows the partially compressed spring strut when the wind deflector has been lowered into the intermediate position, in a lengthwise section; and FIG. 7 shows the compressed spring strut with the wind deflector completely lowered into its raised position, in a lengthwise section.

DETAILED DESCRIPTION OF THE INVENTION

Figure 1:
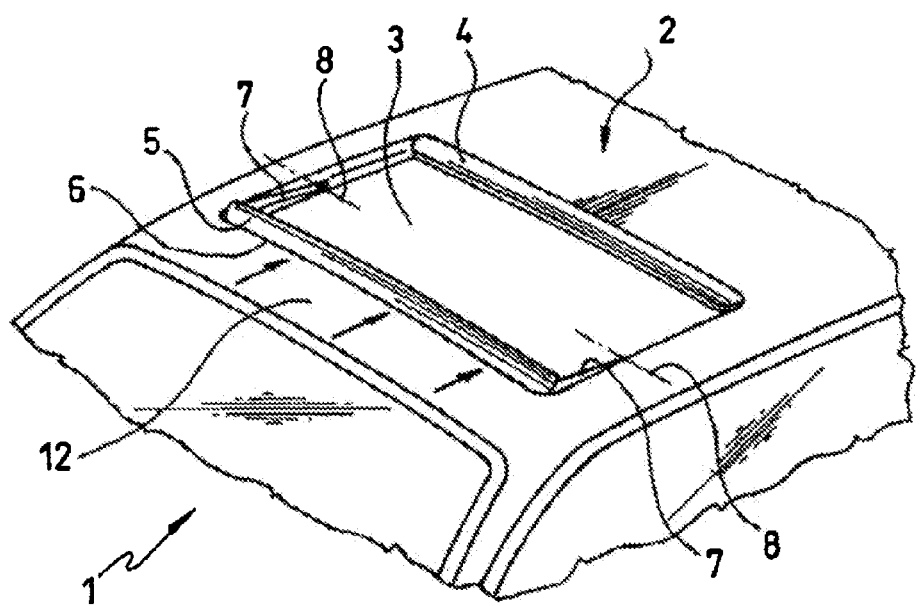
FIG. 1 is a perspective top view of a passenger car with a vehicle roof and a roof opening, a wind deflector and a cover of a sliding roof for closing the roof opening.

A motor vehicle 1 (see FIG. 1) contains a vehicle roof 2 with a roof opening 3 and a cover 4 of the sliding roof which can be moved in the known manner between the closed position which closes the roof opening 3 and an open position which clears the roof opening 3. A wind deflector 5 is assigned to the forward edge 6 of the roof opening 3 and is supported on either side of its wind deflector louver and its air guide profile by means of the bearing arm 7 of a bearing means, which arm extends from the wind deflector 5 to the rear, with a capacity to pivot around a pivoting axis 8 located on the back end of the bearing arm 7 on the vehicle roof between the lowered rest position and a raised operating position.

A spring means in the form of a spring leg or spring strut 9 (FIG. 2) is supported, on the one hand, on the front end of the bearing arm 7 to be able to pivot around the pivoting axis 10, and on the other hand, on the frame surrounding the roof opening 3 around a pivoting axis 11. The pretensioned spring strut 9 presses the wind deflector 5 up into its raised open position and is compressed when the cover 4 of the sliding roof is moved forward into its closed position and in doing so the wind deflector 5 is lowered into its lowered rest position to below the level of the roof skin 12. The wind deflector 5 is lowered, for example, via a projection or slider (not shown) which is attached to the bottom of the cover 4 and which slides on the bearing arm 7 and presses it down.

The spring strut 9 contains a housing 26 (see FIG. 5) with a cylindrical cavity 13 in which, in the axial direction next to or behind one another, there are a compression spring 14 formed as a helical spring and a pot-shaped sleeve 15 which is pressed by the compression spring 14 against the end wall 17 of the spring strut 9 and of the housing 26 which has a center opening 16. In the sleeve 15, a piston 18 is movably held with a piston rod 19 which extends through the opening 16 in the end side 17 and contains an end piece 20 which has a pivoting axis 11. Opposite the piston rod 19 from the piston 18 a central guiding pin 21 extends through a center opening 23 which is formed in the bottom 22 of the sleeve 15. In the annular space between the piston end 24 and the bottom 22 of the sleeve 15, another compression spring 25, for example a helical spring or an assembly of disk springs, is held pretensioned. The two springs 14, 25, are thus functionally coupled to one another by the bottom 22 of the sleeve 15 which acts as a partition or separating element.

Figure 2:
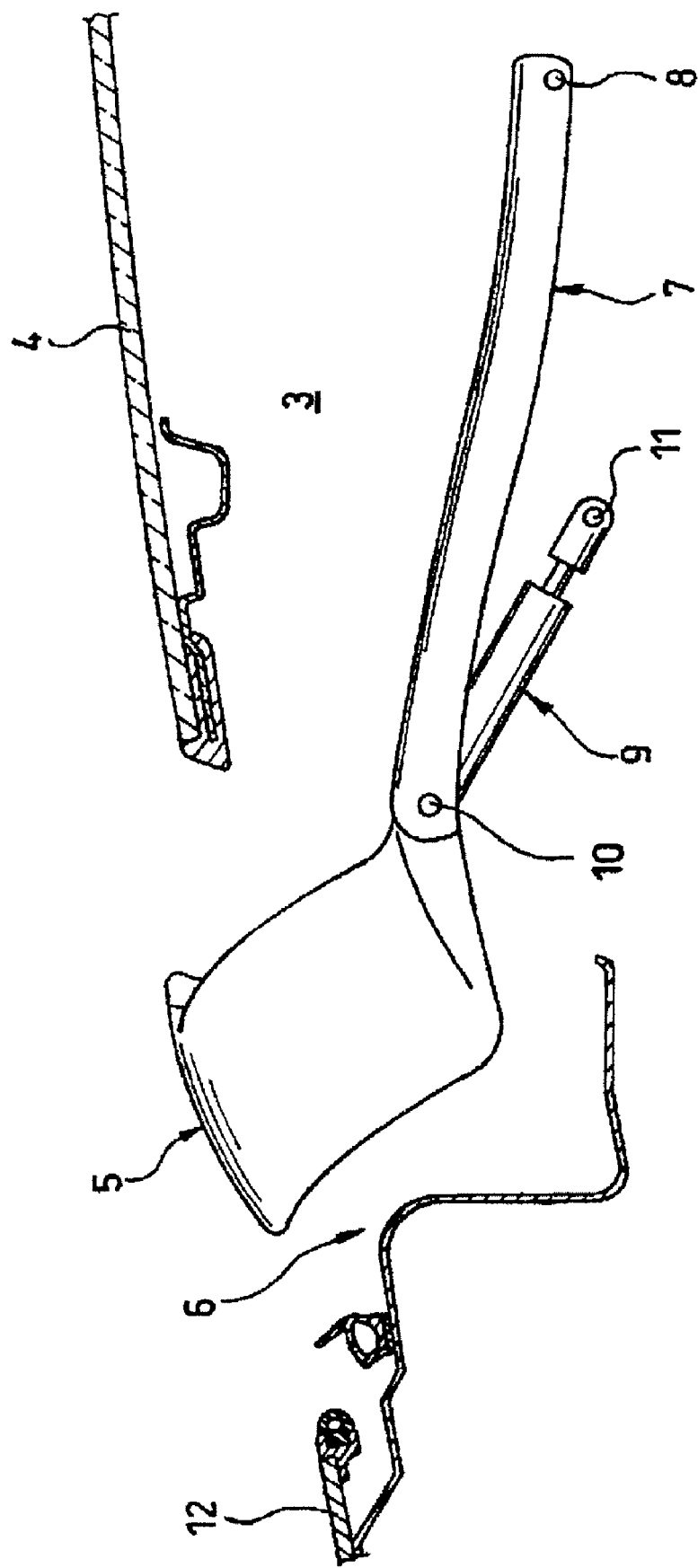
FIG. 2 is a side view of the wind deflector which is movably supported on the bearing arm and raised by the spring strut into the operating position.

If the cover 4 of the sliding roof is moved to the rear for at least partial opening of the roof opening 3, and in doing so, releases the bearing arm 7 to pivot up, the spring strut 9 presses the wind deflector 5 up into its fully raised operating position (see FIG. 2). The spring strut 9, in this connection, assumes it maximum length (see FIG. 5) since the spring forces of the two compression springs 14 25, press both the sleeve 15 and also the piston 18 against the end 17 of the housing 26 of the spring strut 9.

Figure 3:
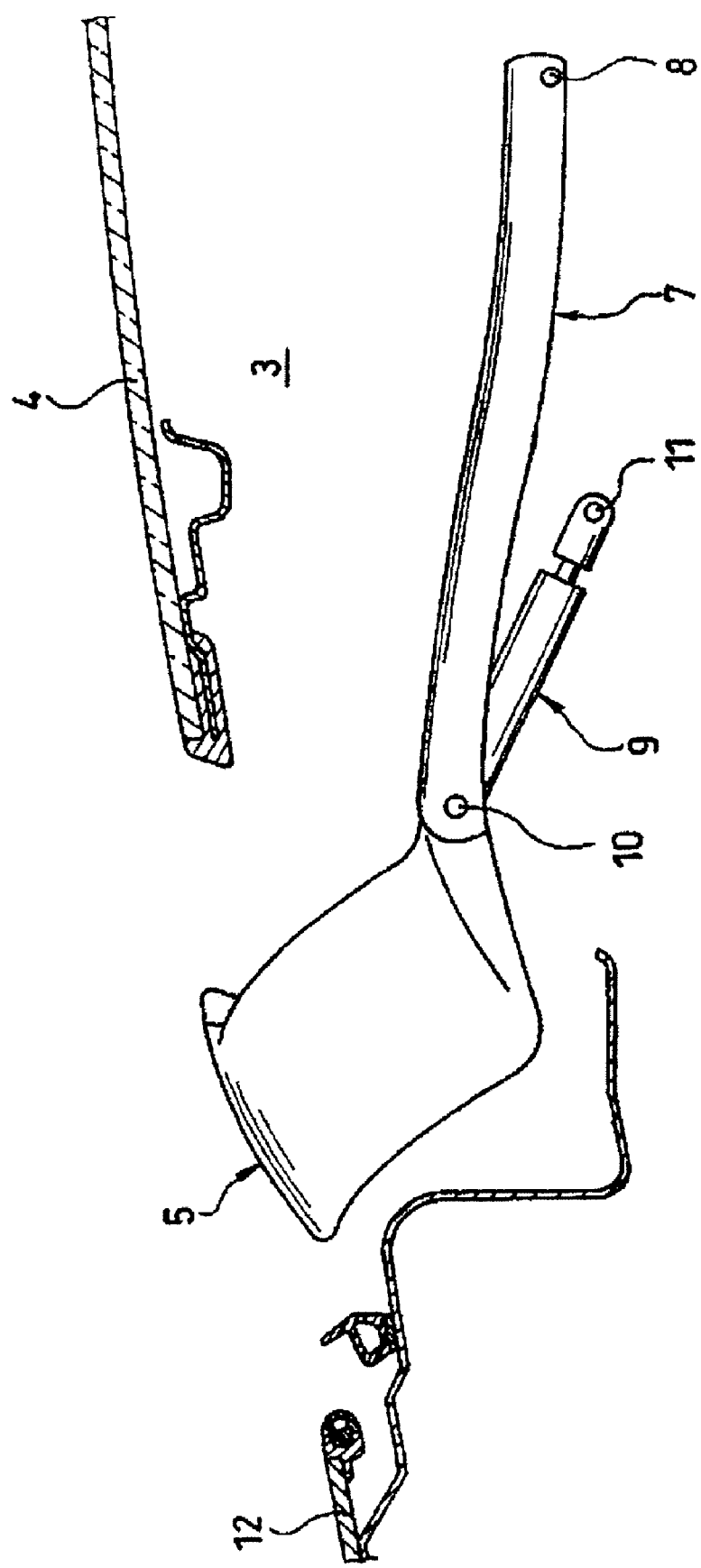
FIG. 3 is a side view of the wind deflector in the intermediate position which has been lowered by the action of the force of the wind.

When driving, air flows around the raised wind deflector 5, which air flow depends on the driving speed. Starting at a certain higher driving speed, for example, 140 km/h, the air flow meeting the wind deflector 5 applies a head wind force with a magnitude sufficient to lower the wind deflector 5 against the force of the spring strut 9. The two compression springs 14, 25, have spring forces and spring characteristics such that, first of all, the housing 26 is pushed relative to the piston 18 by the force of the head wind acting on the spring strut 9, and in doing so, the compression spring 25 (first compression spring) which is located between the piston 18 and the bottom 22 of the sleeve 15 and which has a spring force which is less than the other or second compression spring 14 is compressed, while the second compression spring 14 is not compressed (FIG. 6). Thus, the sleeve 15 adjoins the end wall 17 unchanged. The wind deflector 5 is partially lowered into an intermediate position (FIG. 3), the spring strut 9 being softly deflected due to the flatter spring characteristic of the first compression spring 25. The wind deflector 5 which has been lowered into the intermediate position at higher driving speeds guides the air flow with reduced air resistance.

The second compression spring 14, as compared to the first compression spring 25, has a greater spring force with a steeper spring characteristic such that, even at a higher force of the head wind with a correspondingly higher driving speed (for example, roughly 220 km/h), no further compression of the second compression spring 14 and thus no further shortening of the spring strut 9 take place.

Figure 4:
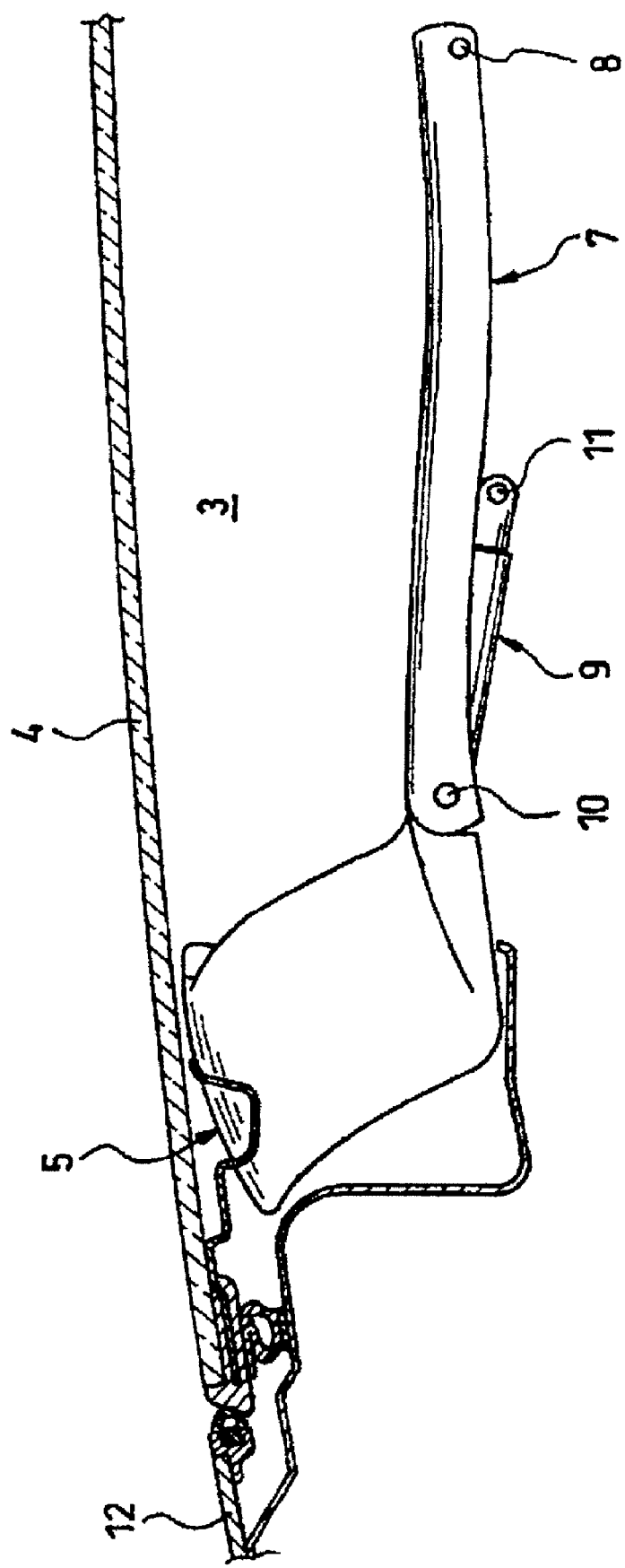
FIG. 4 is a side view of the wind deflector in its rest position which has been pressed down by the closed cover of the sliding roof.

When the cover 4 of the sliding roof is closed, it presses the wind deflector 5 via the bearing arm 7 out of the completely raised operating position or out of the intermediate position which has been lowered by the force of the head wind, into its completely lowered rest position (see FIG. 4). In this connection, the spring strut 9 is further shortened (see FIG. 7), since the second compression spring 14 located between the bottom 22 of the sleeve 15 and the housing 26 is also compressed, while the piston 18 with the sleeve 15 is moved into the space which holds the second compression spring 14.

The wind deflector 5 can be pivotally supported on the bearing arm 7 so that it is pivoted into a space-saving position against a spring force when lowered into the rest position.

Instead of a pot-shaped sleeve a staggered sleeve or in general a separating element can also be used which on the one hand spatially separates the two springs 14, 25, and on the other hand, however, also connects the springs 14, 25 to one another since they are acting on the separating element in opposite action directions. Instead of the illustrated compression springs, in one modified configuration, tension springs can also be used. Of course, more than two springs can also be used in the fundamental structure.

What is claimed is:

1. Wind deflector for a motor vehicle roof, comprising:
   a wind deflector element;
   bearing means for movably supporting the wind deflector element for movement between a lowered rest position and a raised operating position, the bearing means containing a spring means for pretensioning the wind deflector into the raised operating position;
   wherein the spring means has a first range of motion of low spring force and a second range of motion of higher spring force which produce, respectively, a first adjustment region of the wind deflector out of its raised operating position into an intermediate position and a second adjustment region of the wind deflector from the intermediate position into the lowered rest position.

2. Wind deflector as claimed in claim 1, wherein the wind deflector element can be lowered in the first adjustment region and in the first range of motion of low spring force by the force of a head wind and wherein in the second adjustment region and in the second range of motion of higher spring force, an actuating means with an adjustment force which exceeds the force of the head wind is active for further lowering from the intermediate position of the wind deflector to said rest position.

3. Wind deflector as claimed in claim 1, wherein the spring means has a spring characteristic which is staggered between the first range of motion of low spring force and the second range of motion of higher spring force.

4. Wind deflector as claimed in claim 2, wherein a cover for release and closing of the roof opening of an openable vehicle roof or a component which is connected to the cover forms the actuating means.

5. Wind deflector as claimed in claim 1, wherein the spring means comprises a first spring and a second spring, wherein the spring force of the first spring is smaller than that of the second spring and the two springs are arranged such that when the wind deflector is lowered first the first spring which has the lower spring force yields, while the second spring remains rigid, and then the second spring which has the higher spring force also yields.

6. Wind deflector as claimed claim 1, wherein the spring means is a spring strut of variable length with a housing part and a piston part which can be moved relative to the housing part, and wherein the two are compression springs located functionally between the housing part and the piston part in series connection and are separated from one another by a movable separating element, wherein, in the lengthwise direction of the spring strut, the two springs pretension the piston part against an end stop on the housing part, and in doing so, the second spring keeps the separating element pretensioned against the end stop on the housing part, wherein, when the spring strut is shortened in the first adjustment region, the second spring which has the higher spring force keeps the separating element pretensioned on the end stop, while the piston part moves against the separating element as the first spring is shortened, and wherein, with further shortening of the spring strut in the second adjustment region, the piston part shortens the second spring with entrainment of the separating element.

7. Wind deflector as claimed in claim 6, wherein the spring characteristic of the spring means on a transition from the first adjustment region to the second adjustment region has an intermediate section in which an increase of the adjustment force or of the force of the head wind does not cause shortening of the spring means or spring strut.

8. Wind deflector as claimed in claim 6, wherein the separating element is formed as a sleeve or pot and is movably located between the housing part and the piston part.

9. Wind deflector as claimed in claim 6, wherein an end wall of the housing part forms the end stop for at least one of the separating element and the piston part.

10. Wind deflector as claimed in claim 1, wherein the spring means has a first spring having a soft spring characteristic and a second spring having a spring characteristic which is hard compared to the first spring.

* * * * *